United States Patent [19]

Usui et al.

[11] 3,795,413
[45] Mar. 5, 1974

[54] INFLATABLE SAFETY DEVICE FOR MOTOR VEHICLE

[75] Inventors: Keizaburo Usui, Yokosuka; Michio Yamaguchi, Yokohama; Yasuhiro Saito, Tokyo; Tsugio Noda, Kawagoe; Takashi Mitani, Kawagoe; Shinzo Tsuji, Kawagoe; Kenichi Mitsuhashi, Tokyo, all of Japan

[73] Assignee: Nissan Motor Company Limited, Yokohama City, Japan

[22] Filed: Apr. 21, 1971

[21] Appl. No.: 136,051

[30] Foreign Application Priority Data
Apr. 25, 1970 Japan.............................. 45-40411
May 4, 1970 Japan.............................. 45-43852

[52] U.S. Cl............................ 280/150 AB, 137/68
[51] Int. Cl.................................................. B60r 21/08
[58] Field of Search .......... 280/150 AB; 137/67, 68; 222/3; 220/89 A, 47

[56] References Cited
UNITED STATES PATENTS
3,567,245  3/1971  Ekstrom ...................... 280/150 AB
2,436,364  2/1948  McDowell........................ 220/89 A
2,920,638  1/1960  Heckethorn et al. .......... 280/89 A X
3,104,681  9/1963  Gray ................................. 215/47 X
3,221,495  12/1965  Tweet .............................. 220/89 A
3,547,467  12/1970  Pociask ........................ 280/150 AB
3,632,135  1/1972  Chute ........................... 280/150 AB Primary Examiner—Kenneth H. Betts
Attorney, Agent, or Firm—William E. O'Brien; George A. Depaoli; Donal E. McCarthy

[57] ABSTRACT

A safety device for a motor vehicle adapted to protect a vehicle occupant from injury in the event of a collision of a motor vehicle. The safety device includes a pressurized gas supply unit comprising pressurized gas generating means and sealing means in closing engagement with a discharge spout of the pressurized gas generating means. The sealing means includes a first split cap member releasably attached to the discharge spout to hermetically seal off the same engaging the discharge spout, a second cap member associated with the first cap member for hermetically seal off the discharge spout, and explosive means for releasing, when activated, the first and second cap members from the discharge spout thereby to provide communication between the discharge spout and the inflatable confinement whereby the pressurized gas is admitted into the inflatable confinement to actuate the same to its protective position.

5 Claims, 5 Drawing Figures

INFLATABLE SAFETY DEVICE FOR MOTOR VEHICLE

This invention relates to a safety device for a motor vehicle and, more particularly, to a safety device for protecting a vehicle occupant from injury during a collision of the vehicle with an obstruction.

A known safety device used in a motor vehicle usually includes an inflatable confinement or protector bag which is normally held in a collapsed or folded position. The confinement is located between the vehicle occupant and structural parts of the vehicle such as a windshield, an instrument panel and a steering wheel whereby, when the confinement is inflated as a result of an impact or collision of the motor vehicle, the vehicle occupant is prevented from contacting the structural parts of the vehicle.

In order that the safety device operates reliably, it is desired that the inflatable confinement be expanded and projected to its protective position as fast as possible when a collision is encountered by the motor vehicle. Improvements have heretofore been made on the safety device for instantaneously detecting an impact encountered by the motor vehicle and for causing the inflatable confinement to assume the protective position as rapidly as possible.

The inflatable confinement is actuated to its expanded position with a pressurized gas which is supplied from an appropriate pressurized gas supply unit. This unit includes a normally closed pressurized gas generator adapted to produce the pressurized gas when opened and a suitable sealing means normally closing the pressurized gas generator. The sealing means is associated with an impact-responsive triggering means which is actuated in response to the collision of the motor vehicle. The sealing means is released from the pressurized gas generator when the triggering means is actuated, allowing the pressurized gas into the collapsed inflatable confinement. This invention is thus directed generally to the thus arranged pressurized gas supply unit and more particularly to the sealing means of this particular unit.

It is, therefore, an object of this invention to provide a safety device having an improved pressurized gas supply unit by which the pressurized gas is supplied to the inflatable confinement immediately when the triggering means is actuated during a collision of a motor vehicle.

Another object of this invention is to provide a safety device having an improved gas supply unit which is simple in construction and which offers ease of assembling during production.

In general, these and other objects and features of this invention may be attained in a pressurized gas supply unit which includes a pressurized gas generator having a pressurized gas discharge spout through which communication is established with the infaltable confinement when the gas generator is opened, and a rupturable sealing means releasably in closing engagement with the discharge spout of the pressurized gas generator. In one embodiment of this invention, the rupturable sealing means includes a unitary cap member which is releasably attached to the pressurized gas discharge spout of the pressurized gas generator through which the sealing means is in closing engagement with the discharge spout of the pressurized gas generator, and a split cap member which is integral with the unitary cap member and which engages with the discharge spout of the pressurized gas generator. The unitary cap member has formed therein at least one weakened portion which is loaded with an explosive means for rupturing the unitary cap member into pieces when activated in response to an impact resulting from a collision of the motor vehicle and consequently providing communication between the discharge spout of the pressurized gas generator and the inflatable confinement. The pressurized gas is thus allowed into the collapsed inflatable confinement, which is consequently expanded to its protective position. In another embodiment, the rupturable sealing means includes an inner split cap member engaging with the discharge spout of the pressurized gas generator, and an outer cap member which is releasably attached to the inner split cap member. The outer split cap member is provided with an explosive means at a substantially central portion thereof for releasing the outer cap member from the inner split cap member thereby to release the inner cap member from the discharge spout of the pressurized gas generator upon activation of the explosive means so that the communication between the discharge spout of the pressurized gas generator and the inflatable confinement is established.

Figure 1:
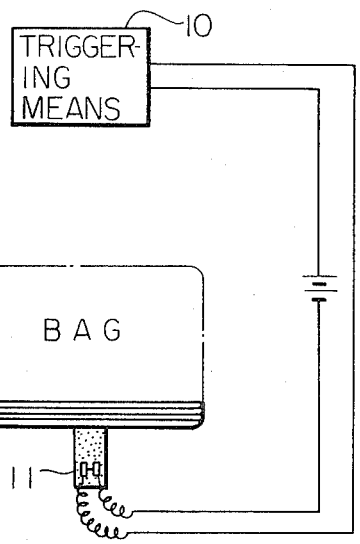
FIG. 1 is a schematic view showing a general construction of the safety device which is dealt with by this invention.

Referring first to FIG. 1, there is schematically shown a general construction of the safety device in which th improvement proposed by this invention is to be incorporated. The safety device largely comprises an impact responsive triggering means 10 which is adapted to be actuated in response to an impact resulting from the collision of the motor vehicle. The triggering means 10 is associated with or connected to a pressurized gas supply unit 11 which is adapted to supply a pressurized gas when the triggering means 10 is actuated. The pressurized gas supply unit 11 includes a pressurized gas generator which may be constructed and arranged in any desired manner. The pressurized gas generator may, for instance, contain a gas under pressure or a liquefied gas which is ready for conversion into a gas under pressure. Or otherwise, the pressurized gas generator may contain an explosive which is adapted to produce a gas under pressure when activated or blown up by suitable means. The pressurized gas supply unit 11 is connected to an inflatable confinement or a protector bag 12 which may be secured to any desired part or parts of the motor vehicle. The inflatable confinement 12 is normally stowed in a contracted or folded position and, when the pressurized gas supplied from the pressurized gas supply unit 11 is admitted thereto, the inflatable confinement is expanded and projected to a position intervening between the vehicle occupant and the structural parts of the vehicle cabin, as previously noted.

According to this invention, the pressurized gas supply unit 11 shown in FIG. 1 is improved with a view to rapidly allowing the pressurized gas into the inflatable confinement 12 when the impact is encountered by the motor vehicle. A preferred form of the pressurized gas supply unit constructed to this end is illustrated in FIG. 2.

Figure 2:
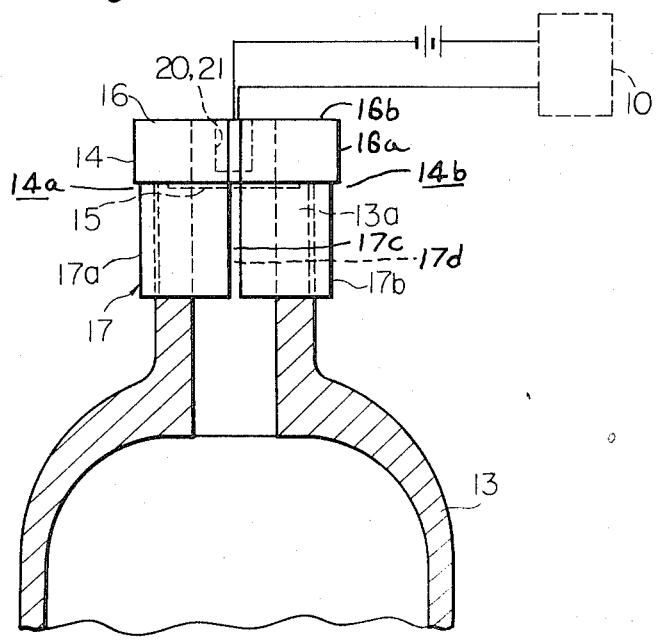
FIG. 2 is a sectional view of a pressurized gas supply unit according to this invention for use in the safety device of FIG. 1.
Figure 3:
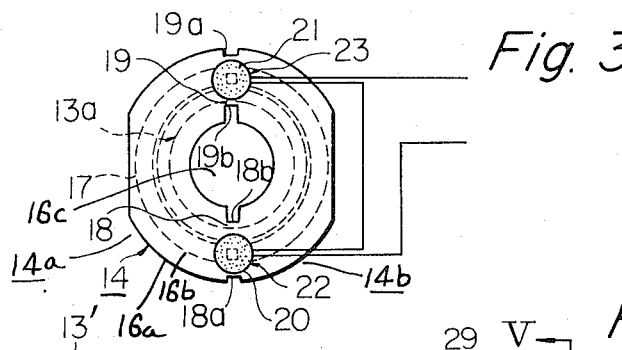
FIG. 3 is a top plan view of a sealing means forming part of the pressurized gas supply unit shown in FIG. 2.

Referring now to FIG. 2, the pressurized gas supply unit largely comprises a pressurized gas generator 13 and a rupturable sealing means 14. The gas generator 13, partially shown in section, is constructed and arranged in any desired manner as previously discussed and produces the pressurized gas when opened. The gas generator 13 is provided with a pressurized gas discharge spout 13a which is normally closed by the rupturable sealing means 14 and which is permitted to communicate with the inflatable confinement 12 (FIG. 1) when opened. The rupturable sealing means 14 is thus releasably in closing engagement with the circumferential end of the discharge spout 13a. The sealing means 14 includes a sealing member 15 which is releasably attached to the discharge spout 13a, a unitary cap member 16 which retains the sealing member 15 to hermetically seal off the discharge spout 13a, and a split cap member 17 which is integral with the unitary cap member 16. The split cap member 17 is shown to comprise substantially identical halves 17a and 17b having semicircular cross sections and engaging with the peripheral wall of the discharge spout 13a. The split cap member 17 is formed between the identical halves 17a and 17b with slots 17c and 17d. As seen in FIGS. 2 and 3, the unitary cap member 16 is formed in a side portion 16a thereof with weakened or yielding portions 18 and 19 which are in line with each other and which are in alignment with the slots 17c and 17d of the split cap member 17, respectively. The weakened portions 18 and 19 are shown as consisting of grooves 18a and 18b and grooves 19a and 19b, respectively. The unitary cap member 16 is formed in an end portion 16b thereof with a hole 16c. The hole 16c of the unitary cap member 16 and the slots 17c and 17d of the split cap member 17 constitute further yielding portions in cooperation with the yielding portions 18 and 19 of the unitary cap member 16. The unitary cap member 16 has bottomed holes 20 and 21 formed in the weakened portions 18 and 19, respectively. The bottomed holes 20 and 21 receive therein explosive means 22 and 23, respectively, which are associated with and activated by the impact-responsive triggering means 10 which is previously mentioned. Thus, the unitary cap member 16 and the split cap member 17 comprise two parts 14a and 14b connected with each other along the weakened portions 18 and 19 and 17c and 17d. The explosive means 22 and 23 may include suitable explosive charge which is fired when the impact-responsive triggering means 10 is actuated.

In the event of a collision of the motor vehicle with an obstruction, the impact-responsive triggering means 10 responds to the impact resulting from the collision. The triggering means 10 is actuated to fire the explosive means 22 and 23 so that the explosive charges are activated. This causes the unitary cap member 17 to be ruptured along the weakened portions 18 and 19 to separate the two parts 14a and 14b of the unitary and split cap members 16 and 17 from each other along the yielding portions, i.e., the weakened portions 18 and 19, the hole 16c and the slots 17c and 17d so that the sealing member 15 is instantaneously released from the discharge spout 13a of the pressurized gas generator 13 to cause the discharge spout 13a to communicate with the inflatable confinement 12 (FIG. 1). The pressurized gas is then admitted into the inflatable confinement 12 through the discharge spout 13a. The inflatable confinement 12 which has been in the contracted position is consequently expanded and projected to the protected position, preventing the vehicle occupant from contacting the structural parts of the motor vehicle.

Figure 4:
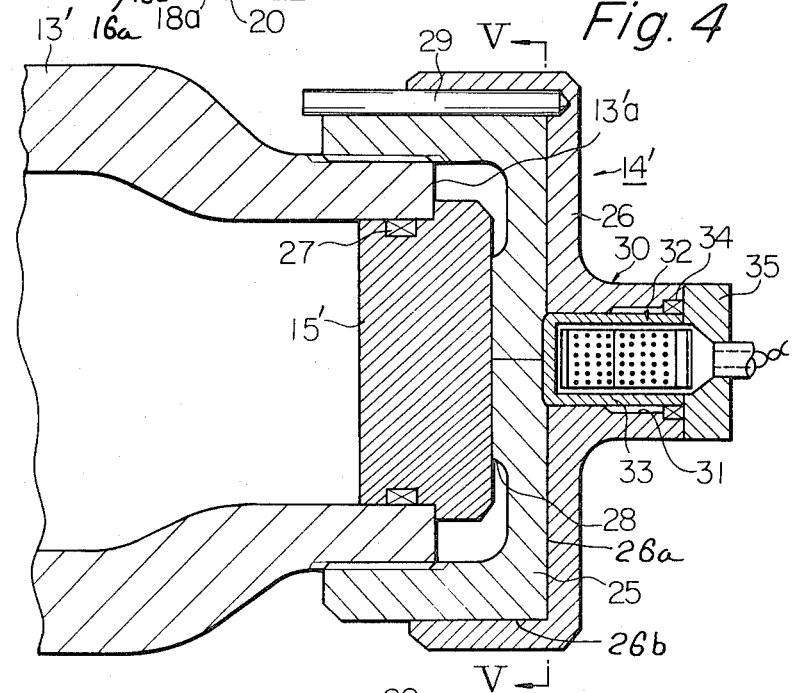
FIG. 4 is a view similar to FIG. 2 but shows a modification of the pressurized gas supply unit shown therein.

FIG. 4 illustrates a modified form of the pressurized gas supply unit for use in the safety device according to this invention. This modified pressurized gas supply unit is substantially similar to that shown in FIGS. 2 and 3 and, therefore, like parts and elements are designated by the same numerals with primes added to them.

Figure 5:
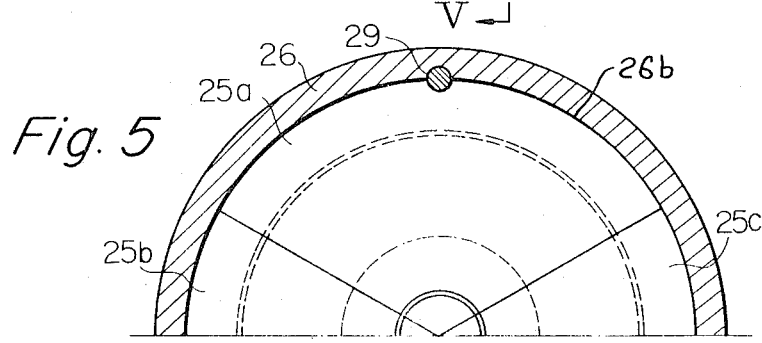
FIG. 5 is a section on line V—V of FIG. 4.

In this modified form of the pressurized gas supply unit, the rupturable sealing means 14' includes, in addition to the sealing member 15', an inner split cap member 25 engaging with the discharge spout 13'a of the pressurized gas generator 13' to retain the sealing member 15' and an outer cap member 26 which is releasably attached to the inner split cap member 25 along yielding portions, that is, a border 26a between an external end portion of the inner split cap member 25 and an internal end portion of the outer cap member 26 and a border 26b between an external side portion of the inner split cap member 25 and an internal side portion of the outer cap member 26. The sealing member 15' is provided with a packing 27 to prevent the flow of the pressurized gas between the discharge spout 13'a and the peripheral wall portion of the sealing member 15' engaging therewith. As seen in FIG. 5, the inner split cap member 25 is shown as consisting of three substantially identical portions 25a, 25b and 25c but may consist of more or less identical portions, if desired. The inner split cap member 25 has a bridge portion 28 formed at a substantially central portion thereof which is adapted to abut against the outer surface of the sealing member 15' thereby to prevent the sealing member 15' from being released from the discharge spout 13'a.

It is to be noted in this instance that although the split cap member 17 in the arrangement of FIGS. 2 and 3 is shown as integral with the unitary cap member 16, the inner split cap member 25 is independent from the outer cap member 26. The outer cap member 26 is adapted to frictionally engage with the outer peripheral wall or the external side portion of the inner split cap member 25 through a pin 29 to maintain engagement between the discharge spout 13'a and the inner split cap member 25 so that the sealing means 14' is prevented from being released from the discharge spout 13'a of the pressurized gas generator 13' during a normal travelling condition of the motor vehicle. It should be understood that the outer cap member 26 may be releasably attached to the inner split cap member 25 by an appropriate adhesive or any other suitable fastening means instead of the pin 29. As shown in FIG. 4, the outer cap member 26 is formed with a projection 30 which extends outwardly from the end portion of the outer cap member 26. The projection 30 has formed therein a hole 31 into which an explosive means 32 is disposed. The explosive means 32 includes an explosive cartridge 33 having therein a suitable explosive charge which is fired when the impact-responsive triggering means 10 (FIG. 1) is actuated. Designated at 34 is a packing which prevents the fluid flow passing through the hole 31. A support 35 is attached to the end of the projection 30 to support the explosive means 32 securely in the hole 31.

In the event of a collision of the motor vehicle, the explosive means 32 is activated upon actuation of the triggering means 10, so that the outer cap member 26 is released from the inner split cap member 25 along the yielding portions, i.e., the borders 26a and 26b between the inner and outer cap members 25 and 26 due to a reaction applied thereto. This causes thhe inner split cap member 25 to be released from the discharge spout 13'a of the pressurized gas generator 13' and the sealing member 15' is instantaneously released from the discharge spout 13'a by means of the pressurized gas in the pressurized gas generator 13' to provide communication between the disdharge spout 13'a and the inflatable confinement 12. The pressurized gas is then admitted into the inflatable confinement 12, which is consequently expanded to its protective position.

It will now be understood from the foregoing description that the pressurized gas supply unit embodying this invention is advantageous because the pressurized gas is allowed into the inflatable confinement almost instantaneously when the impact is encountered by the motor vehicle and because the pressurized gas supply unit is simple in construction and economical to manufacture. The pressurized gas supply unit according to this invention is thus not only reliable in performance but adapted for quantity production especially on account of the ease assembling the component parts.

What is claimed is:

1. A pressurized gas supply unit according to claim 17, wherein said cap means comprises:
    A. a first split cap member, divided into at least two parts and engaging with said discharge spout of said pressurized gas generating means for retaining said releasable sealing means to hermetically seal off said discharge spout, and
    B. a second cap member, engaging said first split cap member at an internal end portion and an internal side portion of said second cap member, respectively, with an external end portion and an external side portion, respectively, of said first split cap member, said second cap member frictionally engaging at said internal side portion thereof with said external side portion of said first split cap member, thereby maintaining engagement between said discharge spout of said pressurized gas generating means and said first split cap member, said yielding portion of said end portion of said cap means comprising a border between said external end portion of said first split cap member and said internal end portion of said second cap member, each of said yielding portions of said side portion of said cap means comprising a border between said external side portion of said first split cap member and said internal side portion of said second cap member, said explosive means being mounted in said second cap member, said second cap member being released from said first split cap member along said yielding portions due to a reaction acting on said second cap member upon detonation of said explosive means thereby causing release of said first split cap member from said discharge spout.

2. A pressurized gas supply unit according to claim 1, wherein said second cap member has a projection extending outwardly from an external end portion of said second cap member, said explosive means being mounted in said projection to release said second cap member from said first split cap member when activated.

3. In a safety device for protecting a vehicle occupant from injury by sudden impact imposed on a motor vehicle and having an inflatable element having a deflated position and an inflated protective position, a pressurized gas supply unit comprising pressurized gas generating means storing a source of a pressurized gas for inflating said inflatable element and having a pressurized gas discharge spout communicating with said inflatable element, releasable sealing means in closing engagement with said discharge spout of said pressurized gas generating means, cap means engaging with said discharge spout of said pressurized gas generating means for retaining said releasable sealing means to hermetically seal off said discharge spout, said cap means having an end portion having at least one yielding portion and a side portion having at least two yielding portions which cooperate with said yielding portion of said end portion, said cap means comprising at least two parts connected with each other along at least two of said yielding portions, and explosive means mounted relative to said yielding portion in said cap means for separating said at least two parts of said cap means from each other along said yielding portions to release said cap means and accordingly said releasable sealing means from said discharge spout of said pressurized gas generating means when said explosive means is detonated in response to a sudden impact, thereby providing communication between said discharge spout and said inflatable element so that pressurized gas is admitted into said inflatable element to inflate same to its protective position.

4. A pressurized gas supply unit according to claim 3, wherein said cap means comprises at least two parts connected with each other along said yielding portions of said side portion, said explosive means is disposed in said cap means near each of said yielding portions of said side portion to divide said cap means into said at least two parts along said yielding portions of said side portion, thereby separating said at least two parts from each other along said yielding portions upon detonation of said explosive means.

5. A pressurized gas supply unit according to claim 4, wherein said yielding portion of said end portion of said cap means comprises a hole and each of said yielding portions of said side portion of said cap means comprises a weakened portion located adjacent said explosive means and a slot which is in alignment with said weakened portion.

* * * * *